Sept. 27, 1932.  L. L. CARSON  1,880,120
PUMP VALVE
Filed Aug. 11, 1930
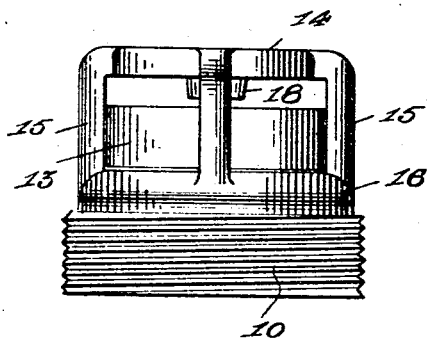
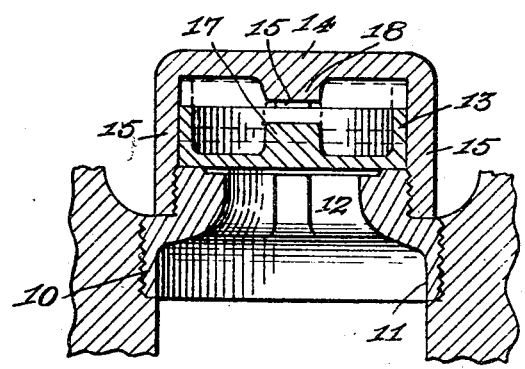
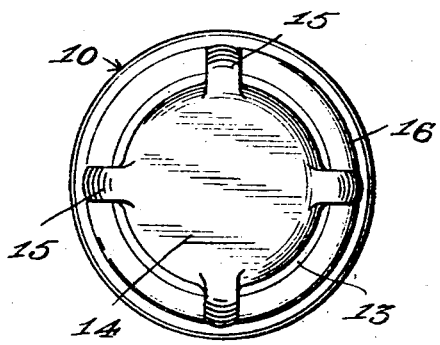
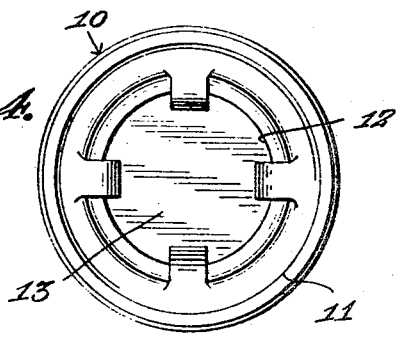
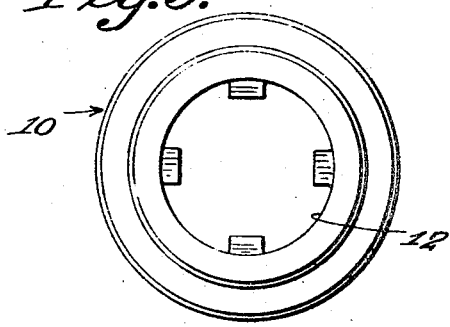
Lee L. Carson,
INVENTOR
BY Victor J. Evans
ATTORNEY
WITNESS:

Patented Sept. 27, 1932

1,880,120

UNITED STATES PATENT OFFICE

LEE L. CARSON, OF WHITTIER, CALIFORNIA, ASSIGNOR OF ONE-FOURTH TO GEORGE T. DUNN, OF SAN DIEGO, CALIFORNIA

PUMP VALVE

REISSUED

Application filed August 11, 1930. Serial No. 474,586.

This invention relates to certain new and useful improvements in valve constructions and more particularly in the elimination of stems, springs and the like.

Another of the objects of the invention consists in the arrangement of a cage for the valve.

An additional object of the invention contemplates the provision and arrangement of stops for the valve and cage designed for abutting engagement to restrict undue distortion and prevent injury to the valve member.

More specifically stated the valve member per se is provided with a fluid receiving cup for coaction with the cage construction in the provision of a hydraulic cushion to check the otherwise accelerated movement of the valve.

With the above and other objects in view, the invention further consists of the following novel features and details of construction, to be hereinafter more fully described, illustrated in the accompanying drawing and pointed out in the appended claim.

In the drawing:—

Figure 1 is a side elevation of my form of valve construction.

Figure 2 is a sectional view taken through the invention as applied.

Figure 3 is a top plan view of the invention.

Figure 4 is a bottom plan view of the invention.

Figure 5 is a top plan view of the invention with the cage and valve member removed.

Referring to the drawing in detail wherein like characters of reference denote corresponding parts, the reference character 10 indicates generally a hollow exteriorly threaded fitting having large and small communicating bores 11 and 12 respectively. The smaller end of the fitting has defined upon the peripheral edge thereof a seat for the accommodation of a valve member 13 of cup shape formation having a flat bottom wall reposing upon the aforementioned seat. The cage construction for the valve assemblage comprises a disk member 14 having arms 15 outwardly and downwardly projecting at intervals from the periphery thereof over and about the valve member 13. An annulus 16 carried upon the extended ends of the arms 15 is interiorly threaded for the accommodation of the reduced end of the fitting.

As suggested from the illustration of my invention in Figure 2 of the drawing, both the valve member 13 and the disk or top 14 for the cage construction are provided with stops 17 and 18 respectively aligned perpendicularly of the valve construction for abutting engagement whereby upward shifting motion of the valve member 13 to a height in excess of that of the dotted line position illustrated will be restricted whereby burrs, nicks and other defacements will not be formed upon the valve member to unbalance or otherwise influence the valve member to occupy positions other than those intended or desired.

The particular formation of the valve member is not only resorted to for the minimizing of the weight thereof so as to render same more sensitive to pressure impulses through a pump construction but also to accommodate some of the fluid allowed to pass beneath the bottom wall thereof for coaction against the inner surface of the disk 14 in the provision of a form of hydraulic brake to snub the opening action of the valve member to obviate the natural tendency of the stops 17 and 18 being subjected to sudden contact to eliminate otherwise objectionable noises.

The diameter of the disk 14 is less than the external diameter of the valve member 13 and greater than the internal diameter thereof as indicated in Figure 3 of the drawing, so that the disk does not extend completely over the valve. Therefore, the top surface of the valve may be subjected to back pressure which will cause the valve to seat promptly when in operation.

Having described the invention, what is claimed is:—

1. A valve comprising an annular fitting having an opening through the center thereof and provided at its top side with a seat, a cage having an annulus engaging the fitting and surrounding said seat and arms rising from said annulus, the cage having a disk at the upper ends of the arms and said disk having a stop portion at its center and under side, a cup valve member fitting snugly between the arms and having a flat under surface adapted to engage said seat and provided at its center with the stop portion adapted to engage the stop portion of the disk, the diameter of the disk being less than the external diameter of the cup valve member and greater than the internal diameter thereof whereby part of the upper surface of the valve member remains uncovered by the peripheral portion of the disk when the stop portions are in contact with each other.

In testimony whereof I affix my signature.

LEE L. CARSON.